(12) United States Patent
Vyers

(10) Patent No.: US 6,445,980 B1
(45) Date of Patent: Sep. 3, 2002

(54) SYSTEM AND METHOD FOR A VARIABLE GAIN PROPORTIONAL-INTEGRAL (PI) CONTROLLER

(75) Inventor: Emmanuel Vyers, Collin, TX (US)

(73) Assignee: Mykrolis Corporation, Bedford, MA (US)

( * ) Notice: Subject to any disclaimer, the term of this patent is extended or adjusted under 35 U.S.C. 154(b) by 0 days.

(21) Appl. No.: 09/351,098

(22) Filed: Jul. 10, 1999

(51) Int. Cl.$^7$ ............................ G05D 11/00; G05D 7/00
(52) U.S. Cl. ..................... 700/282; 700/41; 700/289; 700/37; 318/609; 318/610; 318/619
(58) Field of Search ........................ 700/41–43, 37, 700/282, 289; 318/609–610, 619

(56) References Cited

U.S. PATENT DOCUMENTS

| | | | |
|---|---|---|---|
| 4,139,887 A | 2/1979 | Levesque, Jr. | ............ 700/41 |
| 4,253,153 A | * 2/1981 | Bitterli et al. | ............ 700/277 |

(List continued on next page.)

FOREIGN PATENT DOCUMENTS

| | | | |
|---|---|---|---|
| EP | 0 281 849 A2 | 9/1988 | ........... B60K/41/14 |
| EP | 0 732 636 A2 | 9/1996 | ........... G05B/13/04 |
| JP | 63 208102 A | 8/1988 | ........... G05B/13/00 |

OTHER PUBLICATIONS

LM2764:Simple Switcher Power Converted High Efficiency 500 mA Step–Down Voltage Regulator by National Semiconductor Corporation dated Sep., 1998.

(List continued on next page.)

*Primary Examiner*—Thomas Black
*Assistant Examiner*—Crystal J Barnes
(74) *Attorney, Agent, or Firm*—Gray Cary Ware & Freidenrich

(57) ABSTRACT

A method for generating a valve drive signal using a variable gain PI controller in a mass flow controller. The method includes multiplying an error signal with a proportional gain factor to generate a proportional signal. The method also includes implementing an integral function on the error signal. The integral function includes an integral gain factor which functions as the variable gain in the PI controller. For set-point signals less than a normalized predetermined percentage of the maximum set-point, the gain factor is equal to $$\left[\left(\frac{1}{0.1} - 1\right)A + B\right],$$

where A is a first gain constant and B is a second gain constant. Otherwise, the integral gain factor is $$\left[\left(\frac{1}{x} - 1\right)A + B\right],$$

where A is the first gain constant, B is the second gain constant, and x is the normalized set-point signal. Implementing the integral function produces an integral signal. Lastly, the integral signal and the proportional signal are summed to generate the valve drive signal. The error signal is a function of the difference between a set-point signal and a feedback signal. The set-point signal is a function of a desired flow rate in the mass flow controller, while the feedback signal is a function of the actual flow rate through the mass flow controller.

33 Claims, 2 Drawing Sheets

U.S. PATENT DOCUMENTS

| | | | | |
|---|---|---|---|---|
| 4,498,809 A | * | 2/1985 | Farmer | 405/92 |
| 4,918,932 A | * | 4/1990 | Gustafson | 62/89 |
| 5,059,880 A | * | 10/1991 | Hiroi | 318/610 |
| 5,115,728 A | * | 5/1992 | Ahmed et al. | 454/61 |
| 5,265,594 A | | 11/1993 | Olsson et al. | 128/204.18 |
| 5,319,540 A | * | 6/1994 | Isaza et al. | 700/41 |
| 5,335,165 A | * | 8/1994 | Shinskey | 700/42 |
| 5,455,764 A | | 10/1995 | Meihofer | 700/41 |
| 5,660,207 A | | 8/1997 | Mudd | 137/599.13 |
| 5,765,283 A | | 6/1998 | Mudd | 29/890.13 |
| 5,850,850 A | | 12/1998 | Mudd | 137/486 |
| 5,875,109 A | * | 2/1999 | Federspiel | 700/40 |
| 6,142,163 A | * | 11/2000 | McMillin | 137/14 |

OTHER PUBLICATIONS

Silicon Processing for the VLSI Era, pp. 165, 166, no date.
A Brief Analysis of the Thermal Mass Flow Sensor Excitation Circuit by Dwight Larson dated Sep. 23, 1998.
International Search Report dated Nov. 24, 2000.

* cited by examiner

SYSTEM AND METHOD FOR A VARIABLE GAIN PROPORTIONAL-INTEGRAL (PI) CONTROLLER

TECHNICAL FIELD OF THE INVENTION

This invention relates generally to proportional-integral control systems and methods, and more particularly to proportional-integral control methods in a mass flow controller.

BACKGROUND OF THE INVENTION

Many manufacturing processes require that the introduction rates of process gases into a process chamber be strictly controlled. These types of processes may use mass flow controllers (MFC) to control the flow rate of gases. A mass flow controller is a closed loop device that sets, measures, and controls the flow of the mass of a process gas into a process chamber. Semiconductor applications have been and continue to be the driving force behind product development in mass flow controller technology. Nonetheless, mass flow control is useful in other industries, such as the pharmaceutical industry and the food industry.

A thermal mass flow controller is composed of a front half which includes a flow sensor and a back half which includes a control valve. The flow sensor is often composed of twin resistance temperature sensors wound around a capillary tube. When gas flows through the sensor, heat is carried downstream and the temperature difference is proportional to the mass flow rate of the gas. The temperature difference will cause differential resistance changes in the sensor elements. The control valve receives a signal via electronics from the flow sensor to regulate gas flow. Solenoid activated valves are often used as control valves because of their simplicity, quick response, robustness, and low cost.

Traditional feedback control methods are often used to control the flow of gas in a mass flow controller. In a mass flow controller, the system includes a set-point representing the desired flow of gas in the mass flow controller, a sensor which senses the actual flow rate of a gas in the mass flow controller, a controller, and a plant. The controller consists of electronic circuitry which controls the action of the plant. In the case of the mass flow controller, the plant may be a solenoid activated valve which directly controls the actual flow rate of a gas into a process chamber. The electronic circuitry in the controller can generate a control signal (valve drive signal) based on an error signal. The error signal is the difference between the set-point signal and a feedback signal. In the case of a mass flow controller, the set-point signal is a function of the desired flow rate and the feedback signal is a function of actual flow rate.

Feedback control modes often employed are proportional control, integral control, and derivative control. With proportional control, the control signal is proportional to an error signal. The controller gain can be adjusted to make the control signal sensitive to small deviations between the set-point signal and the feedback signal. Design of the controller gain can also be chosen to make the control signal increase or decrease as the deviation between the set-point signal as the feedback signal increases or decreases. An inherent drawback of proportional-only control is that it is unable to eliminate steady-state errors.

Integral control is often widely used because it provides the advantage of elimination of errors. With integral control, the control signal depends on the integral of the error signal over time. During steady-state operation of the system, if the control error is constant, the integral of the error will change with time and produce an action in the plant that ultimately causes the error to go to zero. The integral controller is not often used alone since little control action in the plant occurs until the error signal has persisted for some time. Proportional control, however, immediately amplifies the error signal. Therefore, integral control is often used in conjunction with proportional control in what is called a proportional integral (PI) controller to generate the valve drive signal (control signal).

Derivative control functions to anticipate the behavior of the error signal. With derivative control, the control signal depends on the rate of change of the error signal. Derivative control also tends to reduce the time needed for the process to reach steady state. Derivative control is used in conjunction with either proportional control or proportional-integral control.

A persistent problem with typical mass flow controllers is that the solenoid valve action is not a linear function of the valve drive signal (control signal). The relationship between the valve drive signal and the actual flow through the mass flow controller for the solenoid valve is with hysterisis. FIG. 1 is a graphical representation of the valve drive signal versus actual flow through a mass flow controller. The gain of the valve increases with flow. The valve drive signal is graphed along the x-axis and the actual flow through the mass flow controller is graphed along y-axis. As the valve drive signal increases, the actual flow through the mass flow controller does not begin to increase until the valve drive signal reaches a value of $X_3$. This amount of time it takes the valve drive signal to reach $X_3$ is denoted as the dead time. Once the valve drive signal reaches the value of $X_3$, the actual flow begins to increase in a proportional (but non-linear) manner as a function of the valve drive signal. Once the valve drive signal has reached a maximum value of $X_4$, decreasing the valve drive signal does not immediately cause a decrease in the actual flow through the mass flow controller. The valve drive signal must be decreased to a level of $X_2$ until the actual flow begins to decrease in a proportional (but non-linear) manner as a function of the valve drive signal. Once the valve drive signal reaches the level of $X_1$, the actual flow may cease. It can be seen from FIG. 1 that when the valve drive signal is weak the response of the valve is negligible, yet when the valve drive signal passes a certain "threshold" ($X_3$) the valve response is greatly increased. The gain of the valve increases with flow. This type of non-linear characteristics associated with the solenoid valve is extremely difficult to control and cannot be fully compensated.

Ultimately, there is a need to compensate for the non-linear behavior of actual flow in a mass flow controller caused by the non-linear relationship between the valve drive signal and the actual flow through the solenoid activated valves.

SUMMARY OF THE INVENTION

The present invention provides a system and method for generating a valve drive signal that substantially eliminates or reduces disadvantages and problems associated with previously developed systems and methods for generating a valve drive signal.

More specifically the present invention provides a system and method for generating a valve drive signal using a variable PI controller in a mass flow controller. The method includes multiplying an error signal with a proportional gain factor to generate a proportional signal. The method also includes implementing an integral function on the error signal. The integral function includes an integral gain factor which functions as the variable gain in the PI controller. For set-point signals less than a normalized predetermined percentage p of the maximum set-point, the integral gain factor is equal to $$\left[\left(\frac{1}{p} - \max(x)\right)A + B\right],$$

where A is a first gain constant, B is a second gain constant, and max(x) is the maximum value of the normalized set-point signal. Otherwise, the integral gain factor is equal to $$\left[\left(\frac{1}{x} - \max(x)\right)A + B\right],$$

where A is the first gain constant, B is the second gain constant, and x is the normalized set-point signal. Implementing the integral function produces an integral signal. Lastly, the integral signal and the proportional signal are summed to generate the value drive signal. The error signal is a function of the difference between a set-point signal and a feedback signal. The set-point signal is a function of a desired flow rate in the mass flow controller, while the feedback signal is a function of the actual flow rate through the mass flow controller.

The present invention provides an important technical advantage in that it enables the integral gain factor in the PI controller to be a variable gain. The integral gain factor is a function of the set-point signal. Thus, for a low set-point signal the effect of the lower valve gain can be compensated with higher integral gain. This mechanism maintains the same control system feedback loop gain regardless of the operating point and enables the system response to be rendered uniform in speed of response and disturbance rejection characteristic, effectively concealing delayed step response and sluggish recovery from inlet pressure disturbance while operating at low set-point (or operating point).

Another technical advantage of the present invention is that it reduces the dead time associated with the valve in the mass flow controller, allowing the control signal to ramp up through the valve dead time with the same efficiency whether the mass flow controller is ramping to 100% of the maximum flow or 5% of the maximum flow.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the figures, like numerals being used to refer to like and corresponding parts of various drawings.

The present invention provides a system and method for generating a valve drive signal using a variable gain PI controller in an mass flow controller. The method includes inputting an error signal into a variable gain PI controller which outputs the valve drive signal. The integral gain factor of the variable gain PI controller is a function of a set-point. The error signal is a function of the difference between the set-point signal and a feedback signal. The set-point signal is a function of a desired flow rate in the mass flow controller, while the feedback signal is a function of the actual flow rate through the mass flow controller.

Figure 1:
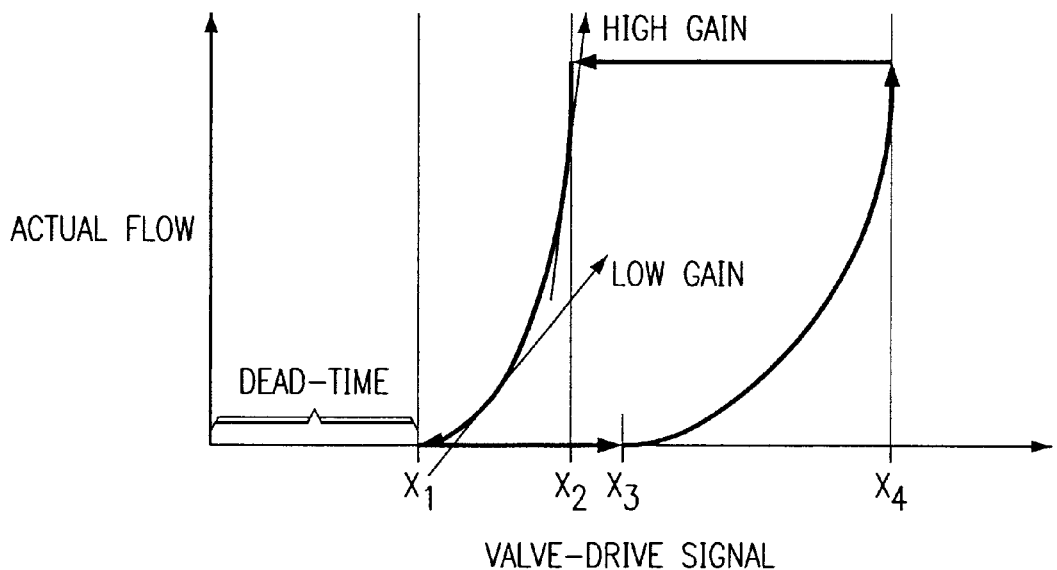
FIG. 1 graphically illustrates the non-linear relationship between the valve drive signal and flow through the valve.
Figure 2:
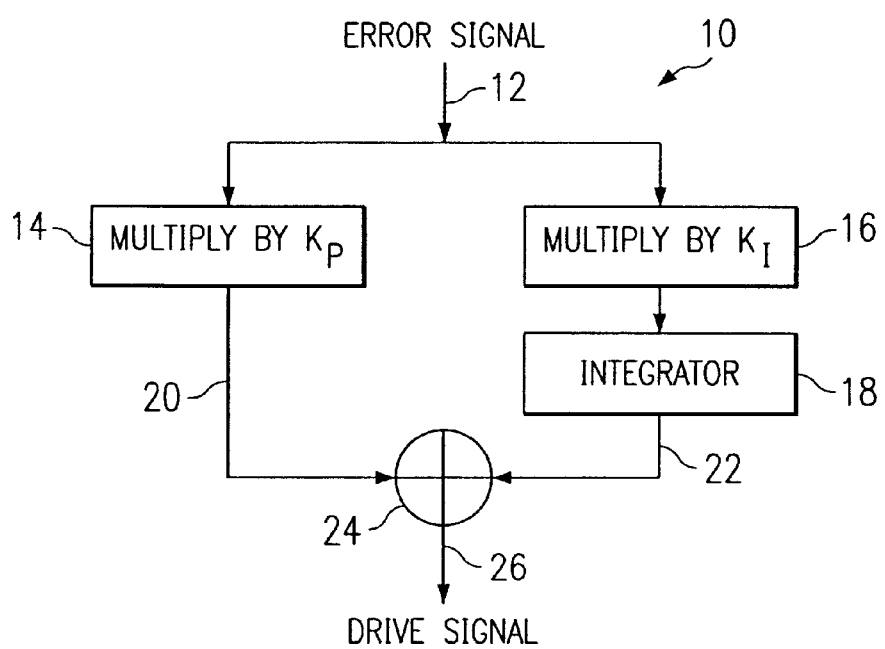
FIG. 2 is a block diagram of a variable PI controller.

FIG. 2 represents the block diagram for one embodiment of the present invention. In FIG. 2, variable gain PI controller 10 consists of proportional gain stage 14, integral gain stage 16, integrator 18, and adder stage 24. Error signal 12 is multiplied by proportional gain constant $K_P$ at proportional gain stage 14 to produce proportional signal 20. Error signal 12 is also multiplied by integral gain factor $K_I$ at integral gain stage 16 and input into integrator 18 to produce integral signal 22. The sequence of integral gain stage 16 and integrator 18 can be reversed without altering integral signal 22. At adder stage 24, integral signal 22 and proportional signal 20 can be combined to form drive signal 26. Both integral gain factor $K_I$ and error signal 12 are functions of a desired set-point.

Figure 3:
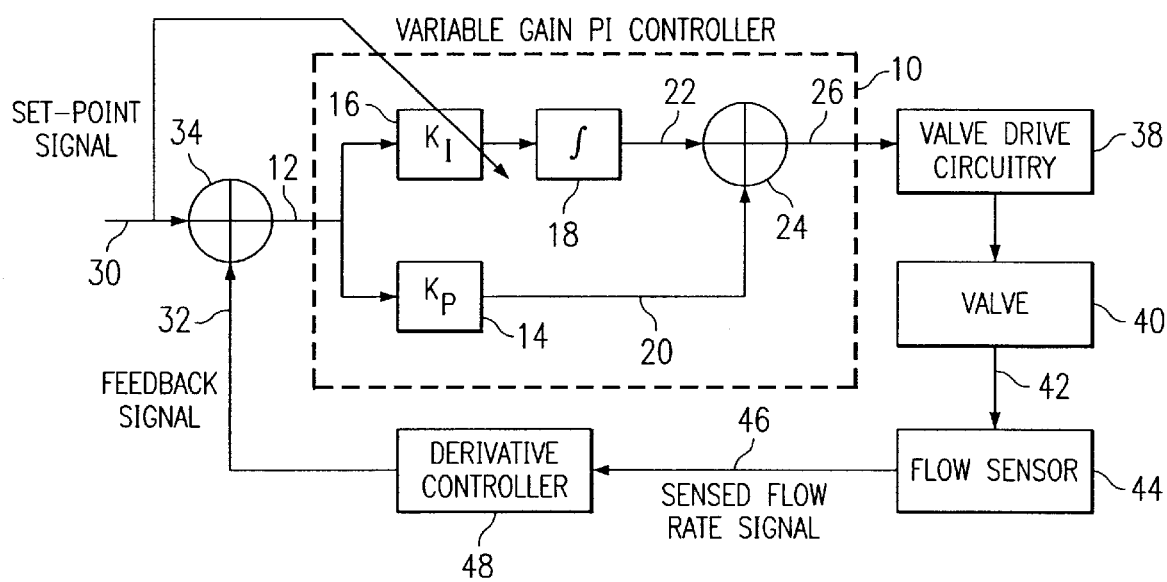
FIG. 3 illustrates one embodiment of the present invention.

FIG. 3 represents one embodiment of the present invention in which variable gain PI controller 10 is used in a mass flow controller 28. In FIG. 3 set-point signal 30 can be compared with feedback signal 32 at adder stage 34 to produce error signal 12. Error signal 12 can be input into PI controller 10. PI controller 10 consists of proportional gain stage 14, integral gain stage 16, integrator 18, and adder stage 24. Error signal 12 is multiplied by proportional gain constant $K_P$ at proportional gain stage 14 to produce proportional signal 20. Error signal 12 may also be multiplied by integral gain factor $K_I$ at integral gain stage 16 and input to integrator 18 to produce integral signal 22. Proportional signal 20 and integral signal 22 are input into adder stage 24, to generate drive signal 26. Drive signal 26 can be used to control valve drive circuitry 38 and valve 40. Valve 40 produces an actual flow rate 42 within mass flow controller 28. Actual flow rate 42 can be measured by flow sensor 44. Flow sensor 44 outputs sensed flow rate signal 46. Sensed flow rate signal 46 may be input into derivative controller 48. Derivative controller 48 may produce feedback signal 32. Proportional gain constant $K_P$ is set to a fixed value. This value can be determined emperically such that the output (drive signal 26) is the desired response to a set-point signal 30 equal to a step input.

Integral gain factor $K_I$ at integral gain stage 16 is a function of set-point signal 30. Integral gain stage 16 is designed to compensate for the delay in the response of valve 38 when set-point signal 30 is low.

Figure 4:
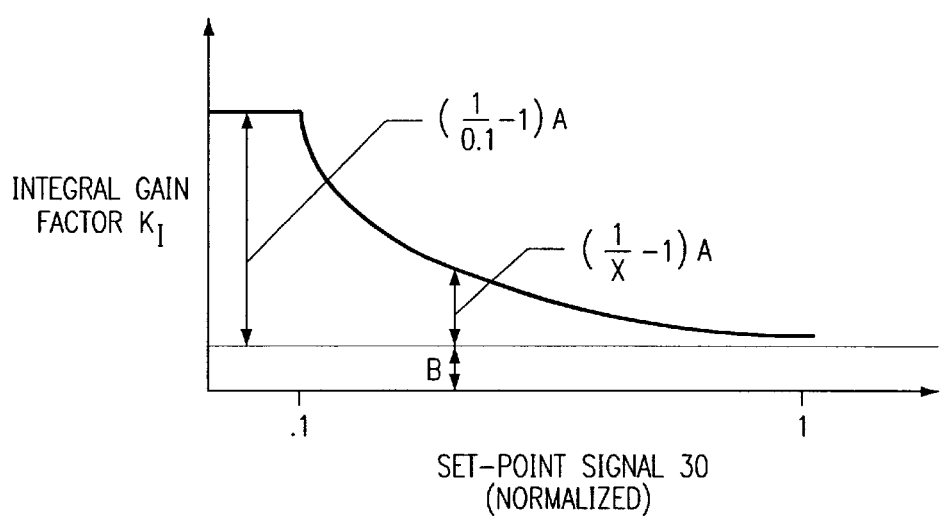
FIG. 4 illustrates the graphical relationship between integral gain factor and set-point signal.

FIG. 4 is a graphical representation of the relationship between integral gain factor $K_I$ and set-point signal 30. Set-point signal 30 (normalized) is graphed along the x-axis, while integral gain factor $K_I$ is graphed along the y-axis. The relationship between integral gain factor $K_I$ and set-point signal 30 is given by $$K_1 = \begin{cases} \left(\frac{1}{x} - 1\right)A + B & \text{for } x > 0.1(\max(x)) \\ \left(\frac{1}{0.1} - 1\right)A + B & \text{for } x < 0.1(\max(x)), \end{cases} \quad \text{[EQN 1]}$$

were x is the normalized set-point signal 30, max(x) is a maximum value of (max(x)=1) set-point signal 30, A is a first constant, and B is a second constant. Note for set-point signal 30 lower than 10% of the maximum value of set-point signal 30, the integral gain factor $K_I$ is saturated to prevent the integral gain factor $K_I$ from growing to infinity.

Second constant B is adjusted by observation to get an optimal response from valve 40 on 0→100% steps of set-point signal 30. To calculate second constant B, set-point signal 30 is set to a step input on 0→100% of the maximum set-point signal. Drive signal 26 can be observed using data acquisition software. Second constant B is adjusted as a variable in software to achieve the desired step response for 0→100% step input. With this setting alone, the response of valve 40 to lower values of set-point signal 30 can be too slow. Therefore, first constant A is adjusted to get the same quality of step response toward lower values set-point signal 30 (0→10%) using the same method of observation. With first constant A and second constant B, proper response becomes uniform across all requests of set-point signal 30.

Both PI controller 10 and derivative controller 48 can be implemented digitally using difference equations in a digital signal processor (DSP) controller. If set-point signal 30 or sensed flow rate signal 46 are analog signals, these signals can easily be converted to digital signal by implementing A/D converters prior to inputting set-point signal 30 into PI controller 10 or sensed flow rate signal 46 into derivative controller 48. A/D converters can be external to the DSP controller or internal to the DSP controller. When using a DSP controller, error signal 12, drive signal 36, and feedback signal 32 are digital signals.

The DSP controller may also be operable to communicate with a computer, such as a personal computer (PC). The computer may aid the DSP controller with large mathematical computations. The computer can download via a connection between the computer and the DSP controller results of performed calculations to the DSP controller. The DSP controller may have or interface to a storage device such as a EEPROM to store calculations downloaded from a computer.

Derivative controller 48 may be implemented using a standard first derivative implementation known to those skilled in the art. Alternatively, to gain a more accurate approximation of actual flow rate 42 and compensate for delay introduced by flow sensor 44, derivative controller 48 can be implemented using the method disclosed in U.S. patent application Ser. No. 09/351,120 filed on Jul. 10, 1999, by E. Vyers, et al. entitled "A System and Method For A Digital Mass Flow Controller".

The DSP controller may also implement linearization of sensed flow rate signal 46 prior to inputting sensed flow rate signal 46 into derivative controller 48. Many methods exist for linearization such as least squares and other regression techniques. Reference is made to the method disclosed in U.S. patent application Ser. No. 09/350,747 filed Jul. 9, 1999, by T. I. Pattantyus and F. Tariq entitled "Method and System for Sensor Response Linearization".

Sensor 44 may consist of two resistive temperature sensors wound around a capillary tube. The two resistive temperature sensors can couple to interface circuitry for conditioning the signal produced by the two resistive temperature sensors. Particular reference is made to the interface circuit disclosed in U.S. patent application Ser. No. 09/350, 746 filed Jul. 9, 1999 by T. I. Pattantyus et. al. entitled "Improved Mass Flow Sensor Interface Circuit".

Valve 40 may be a solenoid activated value. There are many circuit configurations that can be used for valve drive circuitry 38. These configurations can convert drive signal 26 into a drive circuit for a solenoid that drives valve 40. Drive signal 26 may be a digital signal. Most of the circuits that can be used for valve drive circuitry 38 include a control element, such as a transistor. The control element continuously switches a voltage across the solenoid. The switching is a function of drive signal 26. In turn, an average solenoid current can be generated in the solenoid which is a function of the switching rate of the voltage across the solenoid. The solenoid circuit activates valve 40. Particular reference is made to the valve drive circuitry disclosed in U.S. patent application Ser. No. 09/351,111 filed Jul. 10, 1999, by T. I. Pattantyus entitled "Method and System for Driving a Solenoid".

The present invention provides an important technical advantage in that it enables the integral gain factor $K_I$ in the PI controller 10 to be a variable. The integral gain factor $K_I$ is a function of the set-point signal 30. Thus, for low set-point signal 30 the system response can be accelerated.

Another technical advantage of the present invention is that the dead time associated with valve 40 is reduced. The dead time of valve 40 is reduced with the same efficiency whether mass flow controller 28 is being ramped to 100% of the maximum possible flow through the controller or 5% of the maximum possible flow through the controller.

Still yet another technical advantage of the present invention is that there is a uniform speed of response of valve 40 regardless of the magnitude of the change in set-point signal 30. In other words, valve 40 responds with the same speed when set-point signal 30 is set to 100% of the maximum possible flow through mass flow controller 28 or 5% of the maximum possible flow through mass flow controller 28. Through the use of a variable gain for integral gain fact $K_I$, valve 40 has a uniform speed of response. Integral gain factor $K_I$ compensates for the non-linear behavior innate to valve 40.

Another technical advantage of the present invention is uniform disturbance rejection (inlet pressure disturbance). The overall gain of the closed loop of PI controller 10 is a constant.

Another technical advantage of the present invention is that the dead time for valve 40 is reduced. Due to the adjustable gain for integral gain factor $K_I$, the dead time for valve 40 is reduced by increasing the gain and speeding the response of valve 40.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for generating a valve drive signal using a variable gain PI controller in a mass flow controller, said method comprising the a steps of:
   multiplying an error signal by a proportional gain factor to generate a proportional signal;
   implementing an integral function including an integral gain factor on said error signal to generate an integral signal, said integral gain factor equal to:
   a first gain function for a normalized set-point signal less than a predetermined percentage of a maximum normalized set-point signal;
   a second gain function for said normalized set-point signal greater than a predetermined percentage of said maximum normalized set-point signal; and summing said integral signal and said proportional signal to generate said valve drive signal.

2. The method of claim 1, wherein said predetermined percentage is 10%.

3. The method of claim 1, wherein said first gain function is equal to $$\left[\left(\frac{1}{0.1} - 1\right)A + B\right],$$

where A is a first gain constant and B is a second gain constant.

4. The method of claim 3, wherein said second gain function is equal to $$\left[\left(\frac{1}{x} - 1\right)A + B\right],$$

where A is said first gain constant, B is said second gain constant, and x is said normalized set-point signal.

5. The method of claim 4, wherein said second gain constant is obtained empirically to attain a desired response to a step input into said variable gain PI controller of 0% to 100% of said maximum normalized set-point signal.

6. The method of claim 5, wherein said first gain constant is obtained empirically to attain a desired response to a step input into said variable gain PI controller of 0% to 10% of said maximum normalized set-point signal.

7. The method of claim 1, wherein said error signal is a difference between a set-point signal that is a function of a desired flow rate signal in said mass flow controller and a feedback signal that is a function of an actual flow rate through said mass flow controller.

8. The method of claim 7, wherein said set-point signal and said feedback signal are digital signals.

9. A variable gain PI controller comprising:

a proportional function for weighting an error signal with a proportional gain factor to generate a proportional signal;

an integral function that includes an integral gain factor to generate an integral signal, said integral gain factor is equal to:
  a first gain function for a normalized set-point signal less than a predetermined percentage of a maximum normalized set-point signal;
  a second gain function for said normalized set-point signal greater than said predetermined percentage of said maximum normalized set-point signal; and an adder for summing said proportional signal and said integral signal to generate a control signal.

10. The system of claim 9, wherein said predetermined percentage is 10%.

11. The system of claim 9, wherein said first gain function is equal to $$\left[\left(\frac{1}{0.1} - 1\right)A + B\right],$$

where A is a first gain constant and B is a second gain constant.

12. The system of claim 11, wherein said second gain function is equal to $$\left[\left(\frac{1}{x} - 1\right)A + B\right],$$

where A is said first gain constant, B is said second gain constant, and x is said normalized set-point signal.

13. The system of claim 12, wherein said second gain constant is obtained empirically to attain a desired response to a step input into said variable gain PI controller of 0% to 100% of said maximum normalized set-point signal.

14. The system of claim 13, wherein said first gain constant is obtained empirically to attain a desired response to a step input into said variable gain PI controller of 0% to 10% of said maximum normalized set-point signal.

15. The system of claim 9, wherein said error signal is a difference between a set-point signal that is a function of a desired flow rate signal in a mass flow controller and a feedback signal that is a function of an actual flow rate through said mass flow controller.

16. The system of claim 15, wherein said set-point signal and said feedback signal are digital signals.

17. A mass flow controller for controlling the flow of a liquid or gas in a manufacturing process, said mass flow controller comprising:

valve drive circuitry for controlling a solenoid-activated valve that controls an actual flow rate of said liquid or gas in said manufacturing process;

a flow sensor for measuring said actual flow rate of said substance and outputting a sensed flow rate signal;

a derivative controller for converting said sensed flow rate signal into a feedback signal that more closely approximates said actual flow rate than said sensed flow rate signal; and a variable gain PI controller that converts an error signal between a set-point signal and said feedback signal into said valve drive signal, said variable PI controller comprising:
  a proportional function for weighting an error signal with a proportional gain factor to generate a proportional signal;
  an integral function for implementing a weighted integral of said error signal with an integral gain factor to generate an integral signal, said integral gain factor is equal to:
    a first gain function for a normalized set-point signal less than a predetermined percentage of a maximum normalized set-point signal;
    a second gain function for said normalized set-point signal greater than said predetermined percentage of said maximum normalized set-point signal; and
  an adder for summing said proportional signal and said integral signal to generate a valve drive signal to be input into said valve drive circuitry.

18. The mass flow controller of claim 17, wherein said first gain function is equal $$\left[\left(\frac{1}{0.1} - 1\right)A + B\right],$$

where A is a first gain constant and B is a second gain constant.

19. The mass flow controller of claim 18, wherein said second gain function is equal to $$\left[\left(\frac{1}{x}-1\right)A+B\right],$$

where A is said first gain constant, B is said second gain constant, and x is said normalized set-point signal.

20. The mass flow controller of claim 19, wherein said second gain constant is obtained empirically to attain a desired response to a step into said variable gain PI controller input of 0% to 100% of said maximum normalized set-point signal.

21. The mass flow controller of claim 20, wherein said first gain constant is obtained empirically to attain a desired response to a step into said variable gain PI controller input of 0% to 10% of said maximum normalized set-point signal.

22. A method for generating a valve drive signal using a variable gain PI controller in a mass flow controller, said method comprising the steps of:
   multiplying an error signal by a proportional gain factor to generate a proportional signal;
   implementing an integral function including an integral gain factor on said error signal to generate an integral signal, said integral gain factor equal to:
      a first gain function for a normalized set-point signal less than a predetermined percentage of a maximum normalized set-point signal;
      said first gain function equal to $$\left[\left(\frac{1}{0.1}-1\right)A+B\right],$$

where A is a first gain constant and B is a second gain constant;
      a second gain function for said normalized set-point signal greater than a predetermined percentage of said maximum normalized set-point signal; and
   summing said integral signal and said proportional signal to generate said valve drive signal.

23. The method of claim 22, wherein said second gain function is equal to $$\left[\left(\frac{1}{x}-1\right)A+B\right],$$

where A is said first gain constant, B is said second gian constant, and x is said normalized set-point signal.

24. The method of claim 23, wherein said second gain constant is obtained empirically to obtain a desired response to a step input into said variable gain PI controller of 0% to 100% of said maximum normalized set-point signal.

25. The method of claim 24, wherein said first gain constant is obtained empirically to attain a desired response to said step input into said variable gain PI controller of 0% to 10% of said maximum normalized set-point signal.

26. A variable gain PI controller comprising:
   a proportional function for weighing an error signal with a proportional gain factor to generate a proportional signal;
   an integral function that includes an integral gain factor to generate an integral signal, said integral gain factor is equal to:
      a first gain function for a normalized set-point signal less than a predetermined percentage of a maximum normalized set-point signal;
      said first gain function equal to $$\left[\left(\frac{1}{0.1}-1\right)A+B\right],$$

where A is a first gain constant and B is a second gain constant;
      a second gain function for said normalized set-point signal greater than said predetermined percentage of said maximum normalized set-point signal; and
   an adder for summing said proportional signal and said integral signal to generate a control signal.

27. The system of claim 26, wherein said second gain function is equal to $$\left[\left(\frac{1}{x}-1\right)A+B\right],$$

where A is a first gain constant, B is a second gain constant, and x is a normalized set-point.

28. The method of claim 27 wherein, said second gain constant is obtained empirically to attain a desired response to a step input into said variable gain PI controller of 0% to 100% of said maximum normalized set-point signal.

29. The system of claim 28 wherein, said first gain constant is obtained empirically to attain a desired response to said step input into said variable gain PI controller of 0% to 10% of said maximum normalized set-point signal.

30. A mass flow controller for controlling the flow of a liquid or gas in a manufacturing process, said mass flow controller comprising:
   valve drive circuitry for controlling a solenoid-activated valve that controls an actual flow rate of said liquid or gas in said manufacturing process;
   a flow sensor for measuring said actual flow rate or said substance and outputting a sensed flow rate signal;
   a derivative controller for converting said sensed flow rate signal into a feedback signal that more closely approximates said actual flow rate than said sensed flow rate signal; and
   a variable PI controller that converts an error signal between a set-point signal and said feedback signal into said valve drive signal, said variable PI controller comprising:
      a proportional function for weighing an error signal with a proportional gain factor to generate a proportional signal;
      an integral function for implementing a weighted integral of said error signal with an integral gain factor to generate an integral signal, said integral gain factor is equal to:
         a first gain function for a normalized set-point signal less than a predetermined percentage of a maximum normalized set-point signal; said first gain function equal to $$\left[\left(\frac{1}{0.1}-1\right)A+B\right],$$

where A is a first gain constant an B is a second gain constant;
         a second gain function for said normalized set-point signal greater than said predetermined percentage of said maximum normalized set-point signal; and
      an adder for summing said proportional signal and said integral signal to generate a valve drive signal to be input into said valve drive circuitry.

31. The mass flow controller of claim 30 wherein, said second gain function equal to $$\left[\left(\frac{1}{x}-1\right)A+B\right],$$

where A is a first gain constant, B is second gain constant, and x is a normalized set-point signal.

32. The mass flow controller of claim 31 wherein, said second gain constant is obtained empirically to attain a desired response to a step into said variable gain PI controller input of 0% to 100% of said maximum normalized set-point signal.

33. The mass flow controller of claim 32 wherein, said first gain constant obtained empirically to attain a desired response to said step input into said variable gain PI controller input of 0% to 10% of said maximum normalized set-point signal.

* * * * *